United States Patent
Hsiao et al.

(10) Patent No.: US 9,331,571 B2
(45) Date of Patent: May 3, 2016

(54) POWER CONVERTER WITH AUTOMATIC ON-TIME EXTENSION FUNCTION AND OPERATING METHOD THEREOF

(71) Applicant: uPI semiconductor corp., Zhubei, Hsinchu County (TW)

(72) Inventors: Chih-Wen Hsiao, Zhubei (TW); Chih-Lien Chang, Zhubei (TW)

(73) Assignee: UPI SEMICONDUCTOR CORPORATION, Zhubei, Hsinchu County (TW)

( * ) Notice: Subject to any disclaimer, the term of this patent is extended or adjusted under 35 U.S.C. 154(b) by 21 days.

(21) Appl. No.: 14/272,572

(22) Filed: May 8, 2014

(65) Prior Publication Data

US 2014/0340064 A1 Nov. 20, 2014

(30) Foreign Application Priority Data

May 17, 2013 (TW) .............................. 102117542 A (51) Int. Cl.
*H02M 3/156* (2006.01)
*H02M 1/00* (2006.01)
*H02M 3/157* (2006.01)

(52) U.S. Cl.
CPC .............. *H02M 3/156* (2013.01); *H02M 3/157* (2013.01); *H02M 2001/0012* (2013.01); *H02M 2003/1566* (2013.01)

(58) Field of Classification Search
CPC ............. H02M 2003/1566; H02M 2001/0012; H02M 3/157; H02M 3/158
See application file for complete search history.

(56) References Cited

U.S. PATENT DOCUMENTS

| | | | |
|---|---|---|---|
| 7,868,600 B2 | 1/2011 | Qiu et al. | |
| 8,344,777 B2 | 1/2013 | Qiu et al. | |
| 8,385,085 B2 | 2/2013 | Hattori et al. | |
| 2002/0125869 A1* | 9/2002 | Groom | H02M 3/1584 323/283 |
| 2004/0051518 A1* | 3/2004 | Sartschev | G01R 31/2891 324/762.01 |
| 2007/0013356 A1 | 1/2007 | Qiu et al. | |
| 2010/0045251 A1* | 2/2010 | Murota | H02M 3/158 323/282 |
| 2010/0079123 A1* | 4/2010 | Miyamae | H02M 3/158 323/282 |
| 2010/0283442 A1* | 11/2010 | Nakashima | H02M 3/1588 323/283 |
| 2014/0167716 A1* | 6/2014 | Chen | H02M 3/156 323/271 |
| 2014/0340066 A1* | 11/2014 | Chen | H02M 3/156 323/284 |

FOREIGN PATENT DOCUMENTS

TW 201021389 6/2010

OTHER PUBLICATIONS

Taiwan Office Action dated Nov. 28, 2014.

* cited by examiner

*Primary Examiner* — Jue Zhang
*Assistant Examiner* — Lakaisha Jackson
(74) *Attorney, Agent, or Firm* — McClure, Qualey & Rodack, LLP (57) ABSTRACT

A power converter is disclosed. The power converter includes a comparator and a timing generator. The comparator compares a first input signal with a second input signal to provide a control signal. The timing generator is coupled to the comparator. The timing generator includes a plurality of timing generating units, a logic unit, and a calculation unit. The timing generator generates a plurality of timing signals through the timing generating units and the logic unit according to the control signal, and the calculation unit forms a pulse width modulation (PWM) signal according to the timing signals. At least a part of the timing signals are overlapped.

10 Claims, 6 Drawing Sheets

POWER CONVERTER WITH AUTOMATIC ON-TIME EXTENSION FUNCTION AND OPERATING METHOD THEREOF

BACKGROUND OF THE INVENTION

1. Field of the Invention

The invention relates to a power converter; in particular, to a power converter and an operating method thereof capable of automatically extending an on-time to improve its transient response.

2. Description of the Prior Art

In recent years, power supply circuits have been widely used in different electronic products, such as portable electronic products or computer products. The power supply circuits can provide voltage or current conversion or provide power with fixed voltage or current for electronic products to use. In the power supply circuits, a power integrated circuit (Power IC) is one of necessary active components.

Figure 1:
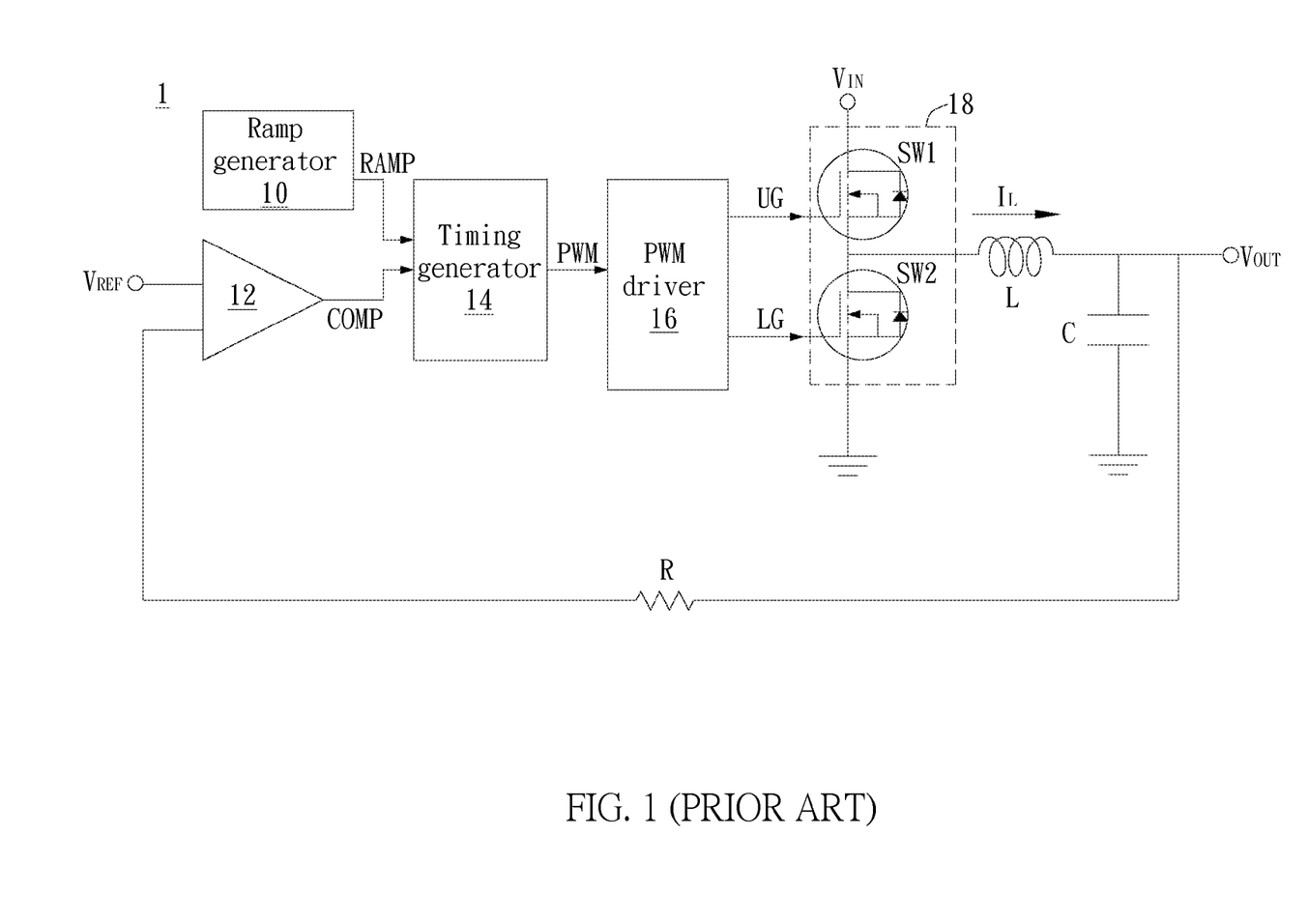
FIG. 1 illustrates a schematic diagram of a power converter with a conventional constant on-time (COT) system structure.
Figure 2:
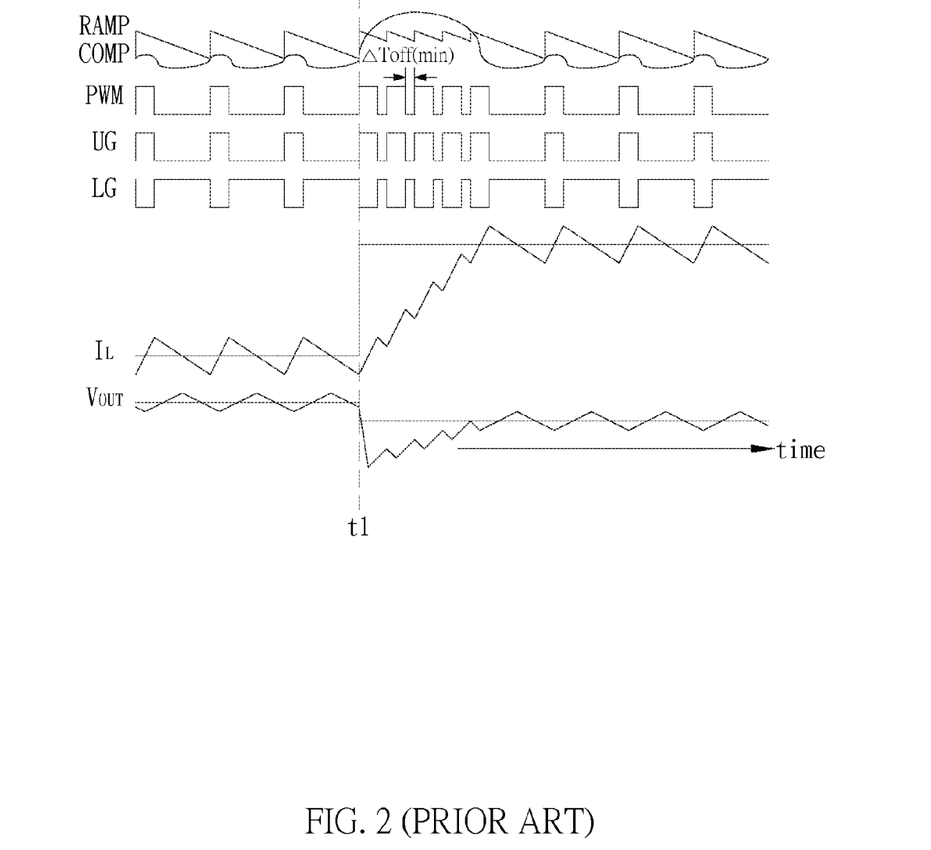
FIG. 2 illustrates a timing diagram of output waveforms of the power converter of FIG. 1.

Please refer to FIG. 1 and FIG. 2. FIG. 1 illustrates a schematic diagram of a power converter with a conventional constant on-time (COT) system structure. FIG. 2 illustrates a timing diagram of output waveforms of the power converter of FIG. 1. As shown in FIG. 1 and FIG. 2, in the conventional COT system structure, every output duty cycle of the power converter 1 includes a fixed on-time and a variable off-time. Since the off-time cannot be zero, there will be a minimum off-time $\Delta T_{off(min)}$ existed in the output duty cycle. When the system loading becomes heavier, a pulse width modulation signal PWM outputted by an on-time calculator 14 has higher frequency to provide a faster transient response.

However, since there is the minimum off-time $\Delta T_{off(min)}$ existed in the output duty cycle, the pulse width modulation signal PWM cannot always be maintained at a high-level, and the inductor current $I_L$ cannot be continuously outputted. Therefore, it takes longer time to provide enough energy to pull back the output voltage $V_{OUT}$ and causes some problems of under shoot and poor output voltage stability. Although some technologies such as skipping off-time can be used to solve these problems, the circuit complexity and manufacturing costs of the power converter 1 will also increased correspondingly.

SUMMARY OF THE INVENTION

Therefore, the invention provides a power converter and an operating method thereof to solve the above-mentioned problems occurred in the prior arts.

An embodiment of the invention is a power converter. In this embodiment, the power converter includes a comparator and a timing generator. The comparator compares a first input signal with a second input signal to provide a control signal. The timing generator is coupled to the comparator. The timing generator includes a plurality of timing generating units, a logic unit, and a calculation unit. The timing generator generates a plurality of timing signals through the timing generating units and the logic unit according to the control signal, and the calculation unit forms a pulse width modulation (PWM) signal according to the timing signals. At least a part of the timing signals are overlapped.

In an embodiment, the calculation unit is coupled to the logic unit, and the calculation unit receives the timing signals from the logic unit and sums the timing signals to form the PWM signal.

In an embodiment, the timing generating units include a first timing generating unit and a second timing generating unit. The first timing generating unit is coupled to the comparator and used for calculating a first stage of a first on-time according to the control signal. The second timing generating unit is coupled between the first timing generating unit and the logic unit. When the first timing generating unit finishes the calculation of the first stage of the first on-time, the second timing generating unit is active to calculate a second stage of the first on-time and the first timing generating unit is active to calculate a first stage of a second on-time.

In an embodiment, the logic unit includes a plurality of flip-flops, a setting unit, and a resetting unit. The flip-flops are coupled to the calculation unit respectively and used for outputting the timing signals to the calculation unit. The setting unit is coupled to the first timing generating unit and the flip-flops respectively and used for selectively switching between the flip-flops. The resetting unit is coupled to the second timing generating unit and the flip-flops respectively and used for selectively switching between the flip-flops.

In an embodiment, the calculation unit is coupled to the timing generating units, and the calculation unit receives the timing signals from the timing generating units and sums the timing signals to form the PWM signal.

In an embodiment, the timing generating units include a first timing generating unit and a second timing generating unit. The first timing generating unit is coupled between the logic unit and the calculation unit and used for calculating a first on-time according to the control signal at a first time. The second timing generating unit is coupled between the logic unit and the calculation unit and used for calculating a second on-time according to the control signal at a second time. A time interval between the first time and the second time is a delay time.

In an embodiment, the logic unit includes a plurality of flip-flops and a delay unit. The flip-flops include a first flip-flop and a second flip-flop. The first flip-flop is coupled between the comparator and the first timing generating unit. The second flip-flop is coupled between the comparator and the second timing generating unit. The first flip-flop and the second flip-flop output the control signal to the first timing generating unit and the second timing generating unit respectively. The delay unit is coupled between the flip-flops and the timing generating units respectively and used for generating the delay time to the first timing generating unit or the second timing generating unit according to the control signal.

Another embodiment of the invention is a method of operating a power converter. In this embodiment, the power converter includes a comparator and a timing generator. The method includes steps of: (a) using the comparator to compare a first input signal with a second input signal to provide a control signal; and (b) using the timing generator to generate a plurality of timing signals according to the control signal and forming a pulse width modulation (PWM) signal according to the timing signals. At least a part of the timing signals are overlapped.

Compared to the prior arts, the power converter and the power converter operating method of the invention have many advantages as follows.

(1) The invention uses multi-step on-time calculation and multi-phase overlapping operation to achieve automatic on-time extension to provide enough energy to pull back the output voltage of the power converter rapidly.

(2) The invention improves the transient response rate when the power converter is heavy loaded.

(3) The power converter of the invention has simple circuit structure without additional circuit and cost.

(4) If the multi-phase circuit is converted into a single-phase circuit, the function of automatic on-time extension can be achieved through the existing circuit of the power converter.

The advantage and spirit of the invention may be understood by the following detailed descriptions together with the appended drawings.

DETAILED DESCRIPTION OF THE INVENTION

A preferred embodiment of the invention is a power converter. In fact, the power converter of the invention is applied in power IC, but not limited to this. The power converter of the invention can be applied in power conversion circuit structures of the AC-DC converter or the DC-DC converter.

In the following embodiments, when a device is described to be "connected" or "coupled" to another device, it is interpreted as that the device is directly connected to or coupled to the other device, or the device is indirectly connected to or coupled to the other device through other devices or connection means. A term "circuit" or "unit" represents at least one device or a plurality of devices, or devices actively and/or passively coupled to each other to provide a suitable function. A term "signal" represents at least one current, voltage, load, temperature, data or other signal. A ramp signal can also be a resemble ramp signal, a triangular wave signal or a sawtooth signal, which may have a repeat-descending type ramp or a repeat-rising type ramp, which is determined according to an actual application.

Figure 3:
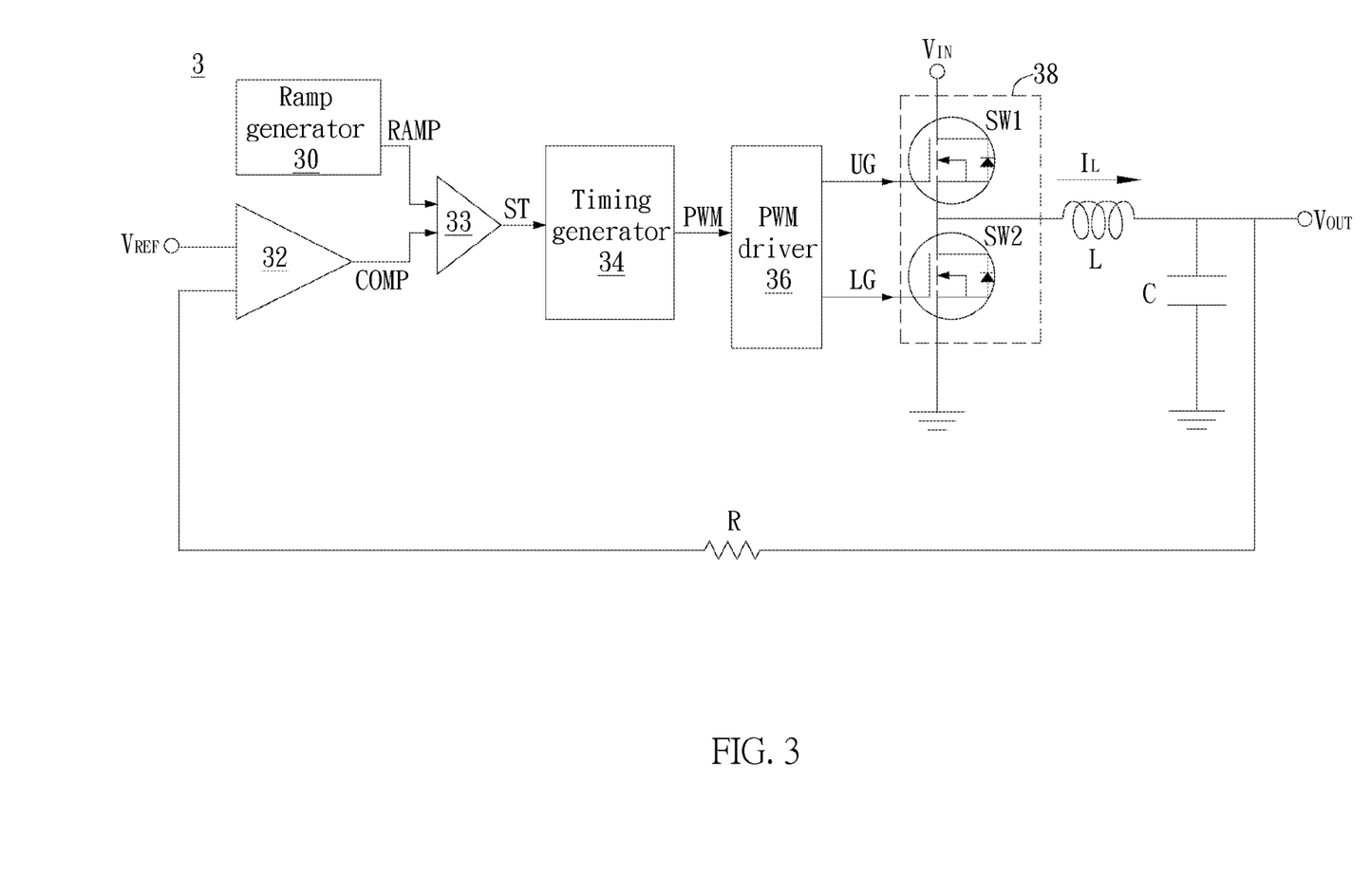
FIG. 3 illustrates a schematic diagram of a power converter in an embodiment of the invention.

Please refer to FIG. 3. FIG. 3 illustrates a schematic diagram of the power converter of this embodiment. As shown in FIG. 3, the power converter 3 includes a ramp generator 30, an error amplifier 32, a comparator 33, a timing generator 34, a pulse width modulation (PWM) driver 36, an output stage 38, an output inductor L, an output capacitor C, and a feedback resistor R. In other embodiments, the error amplifier 32 can be replaced by a transconductance amplifier. The output stage 38 is located between an input voltage $V_{IN}$ and a ground terminal. The output stage 38 includes a first switch SW1 and a second switch SW2. Two input terminals of the error amplifier 32 are coupled to a reference voltage $V_{REF}$ and a feedback voltage $V_{FB}$ respectively, wherein the feedback voltage $V_{FB}$ is proportional to an output voltage $V_{OUT}$ of the power converter 3. An output terminal of the error amplifier 32 and the ramp generator 30 are coupled to two input terminals of the comparator 33. An output terminal of the comparator 33 is coupled to the timing generator 34. The timing generator 34 is coupled to the PWM driver 36. Two output terminals of the PWM driver 36 are coupled to the first switch SW1 and the second switch SW2 of the output stage 38 respectively. A terminal of the output inductor L is coupled between the first switch SW1 and the second switch SW2 of the output stage 38, and another terminal of the output inductor L is coupled to the output voltage $V_{OUT}$. A terminal of the output capacitor C is coupled between the output inductor L and the output voltage $V_{OUT}$, and another terminal of the output capacitor C is coupled to the ground terminal. A terminal of the feedback resistor R is coupled between the output inductor L and the output voltage $V_{OUT}$, and another terminal of the feedback resistor R is coupled to an input terminal of the error amplifier 32.

In this embodiment, two input terminals of the comparator 33 receive a ramp signal (namely a first input signal) RAMP generated by the ramp generator 30 and an error signal (namely a second input signal) COMP generated by the error amplifier 32 respectively. The error amplifier 32 generates the error signal COMP according to the reference voltage $V_{REF}$ and the output voltage $V_{OUT}$. The comparator 33 compares the ramp signal RAMP with the error signal COMP to provide a control signal ST to the timing generator 34. Then, the timing generator 34 will provide a pulse width modulation signal PWM with an on-time to the pulse width modulation driver 36 according to the control signal ST. The two output terminals of the pulse width modulation driver 36 output a first switch control signal UG and a second switch control signal LG to the first switch SW1 and the second switch SW2 of the output stage 38 respectively according to the pulse width modulation signal PWM. The first switch SW1 and the second switch SW2 are switched on or off by the first switch control signal UG and the second switch control signal LG respectively to generate an output inductor current $I_L$ flowing through the output inductor L. In this embodiment, the timing generator 34 generates timing signals which are on-time signals. In other embodiment, the time signals may be off-time signals.

Figure 4:
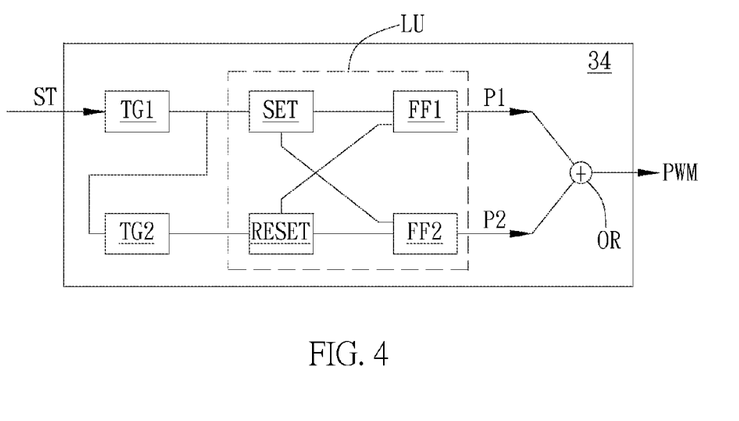
FIG. 4 illustrates an embodiment of the timing generator of FIG. 3.

Please refer to FIG. 4. FIG. 4 illustrates an embodiment of the timing generator 34 of FIG. 3. It should be noticed that the timing generator 34 of this embodiment uses multi-phase and multi-step calculation to generate on-time signals with different phases and divides every on-time signal into stages for calculation to achieve on-time overlapping effect. In fact, the number of the on-time signals with different phases and the number of the stages of every on-time signal can be adjusted based on practical needs. It is not limited to this embodiment.

As shown in FIG. 4, the timing generator 34 includes a first timing generating unit TG1, a second timing generating unit TG2, a logic unit LU, and a calculation unit OR. It should be noticed that the number of the timing generating units in the timing generator 34 can be adjusted based on practical needs. It can be three or more and not limited to two in this embodiment. The logic unit LU includes a setting unit SET, a resetting unit RESET, a first flip-flop FF1, and a second flip-flop FF2. An input terminal of the first timing generating unit TG1 is coupled to the output terminal of the comparator 33 and an output terminal of the first timing generating unit TG1 is coupled to the setting unit SET. An input terminal of the second timing generating unit TG2 is coupled to the output terminal of the first timing generating unit TG1 and an output terminal of the second timing generating unit TG2 is coupled to the resetting unit RESET. The setting unit SET is coupled to first input terminals of the first flip-flop FF1 and the second flip-flop FF2 respectively. The resetting unit RESET is coupled to second input terminals of the first flip-flop FF1 and the second flip-flop FF2 respectively. Output terminals of the first flip-flop FF1 and the second flip-flop FF2 are coupled to the calculation unit OR. The calculation unit OR is coupled to the pulse width modulation driver 36.

Figure 5:
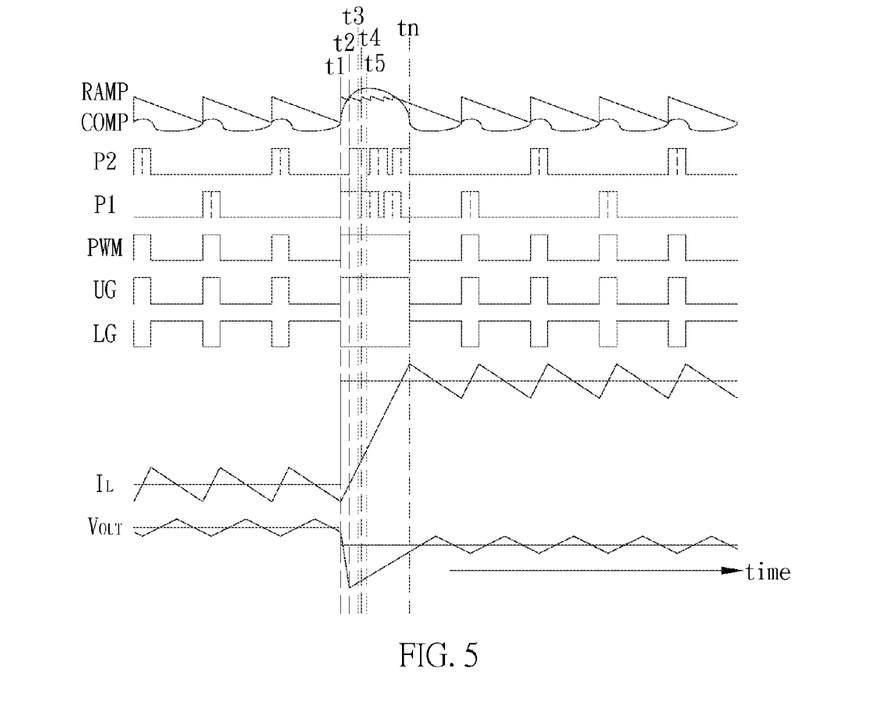
FIG. 5 illustrates a timing diagram of output waveforms of the power converter with the timing generator of FIG. 4.

Please also refer to FIG. 5. FIG. 5 illustrates a timing diagram of output waveforms of the power converter 3 with the timing generator 34 of FIG. 4. In this embodiment, the on-time calculation of every phase can be divided into several stages and the time length of every stage can be also adjusted. In this embodiment, the on-time of every phase is divided into a first stage and a second stage with the same time length for calculation.

As shown in FIG. 4 and FIG. 5, when the error signal COMP rises and intersects the ramp signal RAMP at a first time t1, the comparator 33 outputs the control signal ST to the first timing generating unit TG1 of the timing generator 34, and the first timing generating unit TG1 is active to calculate a first stage of a first on-time of the first timing signal P1. At this time, the setting unit SET switches to the first flip-flop FF1, and the second timing generating unit TG2 is not active to calculate on-time.

At a second time t2, the first timing generating unit TG1 finishes the calculation of the first stage of the first on-time of the first timing signal P1, and the second timing generating unit TG2 is active to continuously calculate a second stage of the first on-time of the first timing signal P1. At this time, the setting unit SET switches to the second flip-flop FF2, and the first timing generating unit TG1 is active to calculate a first stage of a second on-time of the second timing signal P2.

At a third time t3, the second timing generating unit TG2 finishes the calculation of the second stage of the first on-time, and the resetting unit RESET resets the first flip-flop FF1 and the first on-time signal enters to an off-time stage. At this time, the first timing generating unit TG1 also finishes the calculation of the first stage of the second on-time, and the second timing generating unit TG2 is active to continuously calculate a second stage of the second on-time.

At a fourth time t4, the off-time stage of the first on-time signal is finished, the first timing generating unit TG1 is active to calculate the first stage of the first on-time again. At this time, the setting unit SET switches to the first flip-flop FF1, and the second timing generating unit TG2 still calculates the second stage of the second on-time.

At a fifth time t5, the second timing generating unit TG2 finishes the calculation of the second stage of the second on-time, namely the calculation of the second on-time is finished, and the resetting unit RESET resets the second flip-flop FF2 and the second on-time signal enters to an off-time stage. At this time, the first timing generating unit TG1 still calculates the first stage of the first on-time. The rest may be deduced by analogy until the error signal COMP falls and intersects the ramp signal RAMP.

From above, it can be found that when the first timing signal P1 is at its off-time stage, the second timing signal P2 is at its on-time stage. Similarly, when the second timing signal P2 is at its off-time stage, the first timing signal P1 is at its on-time stage. Therefore, if the calculation unit OR is an OR gate, when the calculation unit OR receives the first timing signal P1 and the second timing signal P2 from the output terminals of the first flip-flop FF1 and the second flip-flop FF2 respectively and sums the first timing signal P1 and the second timing signal P2 to obtain the pulse width modulation signal PWM as shown in FIG. 5. Since the pulse width modulation signal PWM can keep at high-level from the first time t1 to an n-th time tn, the two output terminals of the pulse width modulation driver 36 can output the first switch control signal UG and the second switch control signal LG to the first switch SW1 and the second switch SW2 of the output stage 38 respectively to switch on or off the first switch SW1 and the second switch SW2 to continuously generate the output inductor current $I_L$ flowing through the output inductor L. The phase of the first switch control signal UG is the same with that of the pulse width modulation signal PWM. The phase of the second switch control signal LG is opposite to that of the pulse width modulation signal PWM. Therefore, the power converter 3 of this embodiment can waste less time to provide enough energy to pull back the output voltage $V_{OUT}$, and the problems of under shoot and poor output voltage stability occurred in prior arts can be effectively solved by the power converter 3 of this embodiment.

Figure 6:
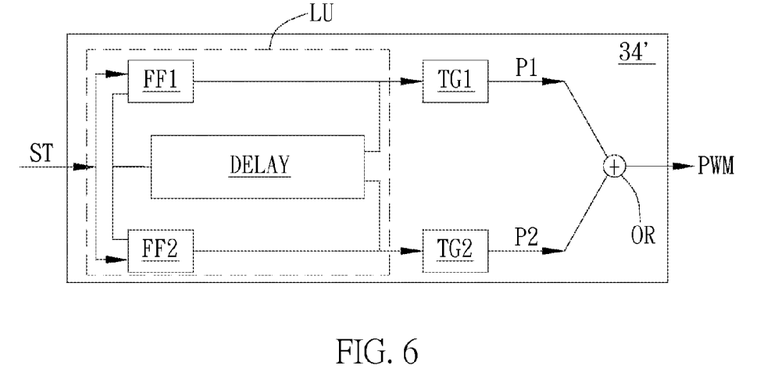
FIG. 6 illustrates another embodiment of the timing generator of FIG. 3.

Please refer to FIG. 6. FIG. 6 illustrates another embodiment of the timing generator of FIG. 3. It should be noticed that the timing generator 34' of this embodiment uses multiphase and delay calculation to generate several timing signals with different phases, and a delay time is used between the calculations of two timing signals to achieve on-time overlapping effect.

As shown in FIG. 6, the timing generator 34' includes a first timing generating unit TG1, a second timing generating unit TG2, a logic unit LU, and a calculation unit OR. It should be noticed that the number of the timing generating units in the timing generator 34' can be adjusted based on practical needs. It can be three or more and not limited to two in this embodiment. The logic unit LU includes a delay unit DELAY, a first flip-flop FF1, and a second flip-flop FF2. It should be noticed that the delay unit DELAY can include logic elements such as a delay time generator and a flip-flop (not shown in the figures) to generate a delay time, so that the timing generating units can be active to calculate on-time at different times.

First input terminals of the first flip-flop FF1 and the second flip-flop FF2 are coupled to an output terminal of the comparator 33 respectively, and second input terminals of the first flip-flop FF1 and the second flip-flop FF2 are coupled. An output terminal of the first flip-flop FF1 is coupled to an input terminal of the first timing generating unit TG1. An output terminal of the second flip-flop FF2 is coupled to an input terminal of the second timing generating unit TG2. An input terminal of the delay unit DELAY is coupled to the second input terminals of the first flip-flop FF1 and the second flip-flop FF2, and the two output terminals of the delay unit DELAY are coupled between the first flip-flop FF1 and the first timing generating unit TG1 and between the second flip-flop FF2 and the second timing generating unit TG2 respectively. Output terminals of the first timing generating unit TG1 and the second timing generating unit TG2 are both coupled to the calculation unit OR. The calculation unit OR is coupled to the pulse width modulation driver 36.

Figure 7:
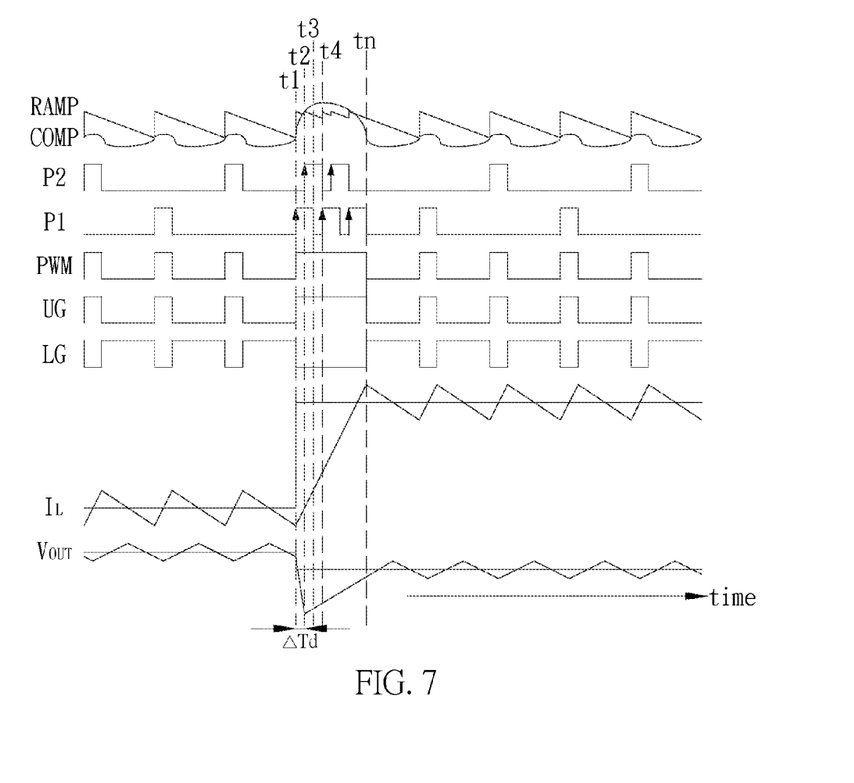
FIG. 7 illustrates a timing diagram of output waveforms of the power converter with the timing generator of FIG. 6.

Please also refer to FIG. 7. FIG. 7 illustrates a timing diagram of output waveforms of the power converter with the timing generator 34' of FIG. 6. As shown in FIG. 6 and FIG. 7, when the error signal COMP rises and intersects the ramp signal RAMP at a first time t1, the comparator 33 outputs the control signal ST to the first flip-flop FF1 and the second flip-flop FF2 of the timing generator 34'. After the first flip-flop FF1 receives the control signal ST, the first flip-flop FF1 activates the first timing generating unit TG1 to calculate a first on-time of the first timing signal P1. At this time, the second timing generating unit TG2 is not active to calculate on-time.

After a period of delay time ΔTd from the first time t1, at a second time t2, the second flip-flop FF2 activates the second timing generating unit TG2 to calculate a second on-time of the second timing signal P2. At this time, the first timing generating unit TG1 still calculates the first on-time of the first timing signal P1.

At a third time t3, the first timing generating unit TG1 finishes the calculation of the first on-time of the first timing signal P1, and the first timing signal P1 enters to an off-time stage. At this time, the second timing generating unit TG2 still calculates the second on-time of the second timing signal P2.

At a fourth time t4, the second timing generating unit TG2 finishes the calculation of the second on-time of the second timing signal P2, and the second timing signal P2 enters to an off-time stage. If the delay time ΔTd is exactly equal to the off-time of the first timing signal P1, the off-time of the first timing signal P1 is over at t4. And, the rest may be deduced by analogy until the error signal COMP falls and intersects the ramp signal RAMP.

From above, it can be found that when the first timing signal P1 is at its off-time stage, the second timing signal P2 is at its on-time stage. Similarly, when the second timing signal P2 is at its off-time stage, the first timing signal P1 is at its on-time stage. Therefore, if the calculation unit OR is an OR gate, when the calculation unit OR receives the first timing signal P1 and the second timing signal P2 from the output terminals of the first timing generating unit TG1 and the second timing generating unit TG2 respectively and sums the first timing signal P1 and the second timing signal P2 to obtain the pulse width modulation signal PWM as shown in FIG. 7. Since the pulse width modulation signal PWM can keep at high-level from the first time t1 to an n-th time tn, the two output terminals of the pulse width modulation driver 36 can output the first switch control signal UG and the second switch control signal LG to the first switch SW1 and the second switch SW2 of the output stage 38 respectively to switch on or off the first switch SW1 and the second switch SW2 to continuously generate the output inductor current $I_L$ flowing through the output inductor L. The phase of the first switch control signal UG is the same with that of the pulse width modulation signal PWM. The phase of the second switch control signal LG is opposite to that of the pulse width modulation signal PWM. Therefore, the power converter of this embodiment can waste less time to provide enough energy to pull back the output voltage $V_{OUT}$, and the problems of under shoot and poor output voltage stability occurred in prior arts can be effectively solved by the power converter of this embodiment.

Figure 8:
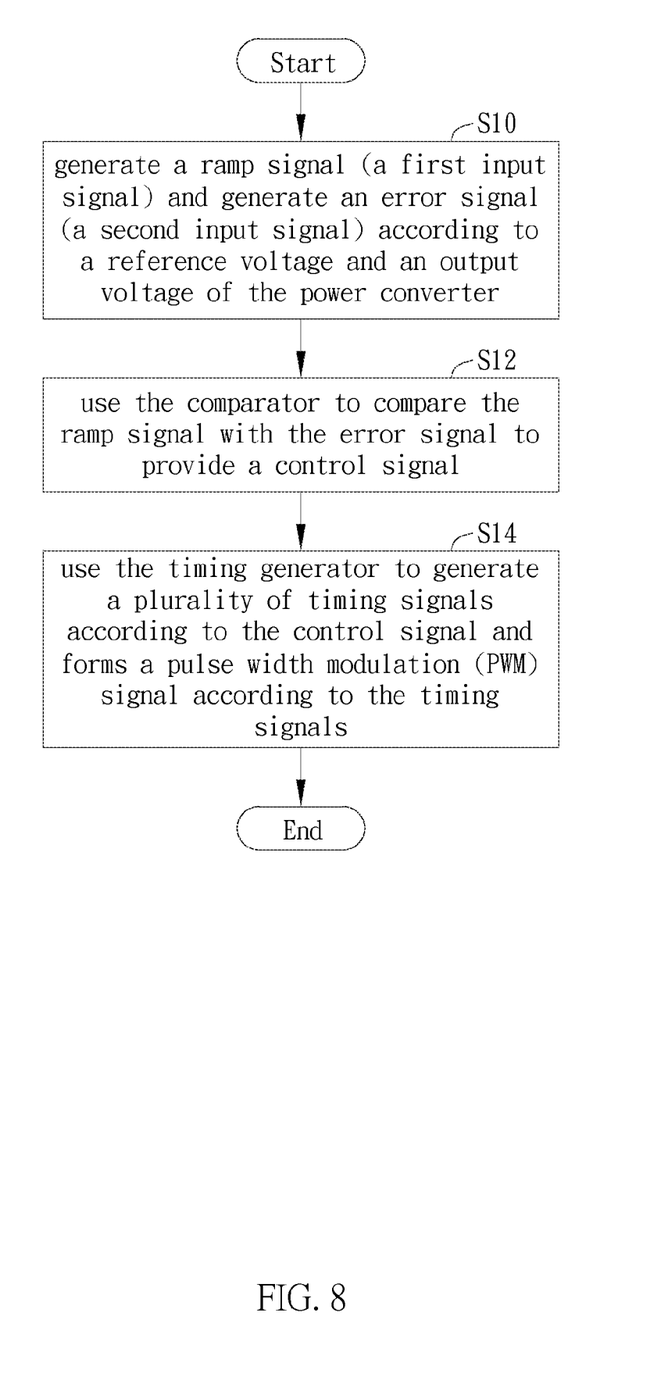
FIG. 8 illustrates a flowchart of a power converter operating method in another embodiment of the invention.

Another embodiment of the invention is a method of operating a power converter. In this embodiment, the power converter includes a comparator and a timing generator. Please refer to FIG. 8. FIG. 8 illustrates a flowchart of the power converter operating method in this embodiment.

As shown in FIG. 8, in the step S10, the method generates a ramp signal (a first input signal) and generates an error signal (a second input signal) according to a reference voltage and an output voltage of the power converter. In the step S12, the method uses the comparator to compare the ramp signal with the error signal to provide a control signal. In the step S14, the method uses the timing generator to generate a plurality of timing signals according to the control signal and forms a pulse width modulation (PWM) signal according to the timing signals. Each of the timing signals has an on-time. It should be noticed that duty cycles of the on-times of the timing signals are at least partially overlapped to increase a duty cycle of an on-time of the PWM signal. That is to say, no matter the duty cycles of the on-times of the timing signals are completely overlapped or partially overlapped, the duty cycle of the on-time of the PWM signal formed according to the timing signals will be increased accordingly.

In fact, different methods can be used in the step S14 to generate timing signals through the timing generator. In an embodiment, the method uses multi-phase and multi-step calculation to generate timing signals with different phases and divides every on-time signal into stages for calculation to achieve on-time overlapping effect.

If the timing generator includes a first timing generating unit, a second timing generating unit, a logic unit, and a calculation unit, the step S14 can further include the following steps: when the first timing generating unit receives the control signal, the first timing generating unit is active to calculate a first stage of a first on-time of a first on-time signal according to the control signal; when the first timing generating unit finishes the calculation of the first stage of the first on-time of the first on-time signal after a first time interval, the second timing generating unit is active to calculate a second stage of the first on-time of the first on-time signal and the first timing generating unit is active to calculate a first stage of a second on-time of a second on-time signal; and after a second time interval, the second timing generating unit finishes the calculation of the second stage of the first on-time of the first on-time signal and the first timing generating unit finishes the calculation of the first stage of the second on-time of the second on-time signal.

In another embodiment, the method uses multi-phase and delay calculation to generate several timing signals with different phases, and a delay time is used between the calculations of two timing signals to achieve on-time overlapping effect.

If the timing generator includes a first timing generating unit, a second timing generating unit, a logic unit, and a calculation unit, the step S14 can further include the following steps: when the logic unit receives the control signal, the logic unit activates the first timing generating unit to calculate a first on-time of a first on-time signal; after a delay time, the logic unit activates the second timing generating unit to calculate a second on-time of a second on-time signal; and when the first timing generating unit finishes the calculation of the first on-time of the first on-time signal, the second timing generating unit continuously calculates the second on-time of the second on-time signal.

Compared to the prior arts, the power converter and the power converter operating method of the invention have many advantages as follows.

(1) The invention uses multi-step on-time calculation and multi-phase overlapping operation to achieve automatic on-time extension to provide enough energy to pull back the output voltage of the power converter rapidly.

(2) The invention improves the transient response rate when the power converter is heavy loaded.

(3) The power converter of the invention has simple circuit structure without additional circuit and cost.

(4) If the multi-phase circuit is converted into a single-phase circuit, the function of automatic on-time extension can be achieved through the existing circuit of the power converter.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A power converter, comprising:
   a comparator, comparing a ramp signal with an error signal to provide a control signal; and
   a timing generator, coupled to the comparator, the timing generator comprising a plurality of timing generating units, a logic unit, and a calculation unit, the timing generator generating a plurality of timing signals through the timing generating units and the logic unit according to the control signal, and the calculation unit forming a pulse width modulation (PWM) signal according to the timing signals, wherein at least a part of the timing signals are overlapped, and the logic unit comprises a plurality of flip-flops coupled between the comparator and the calculation unit.

2. The power converter of claim 1, wherein the calculation unit is coupled to the logic unit, and the calculation unit receives the timing signals from the logic unit and sums the timing signals to form the PWM signal.

3. The power converter of claim 1, wherein the timing generating units comprises:
 a first timing generating unit, coupled to the comparator, for calculating a first stage of a first on-time according to the control signal; and
 a second timing generating unit, coupled between the first timing generating unit and the logic unit,
wherein when the first timing generating unit finishes the calculation of the first stage of the first on-time, the second timing generating unit is active to calculate a second stage of the first on-time and the first timing generating unit is active to calculate a first stage of a second on-time.

4. The power converter of claim 3, wherein the logic unit comprises:
 the plurality of flip-flops for outputting the timing signals to the calculation unit;
 a setting unit, coupled to the first timing generating unit and the flip-flops respectively, for selectively switching between the flip-flops; and
 a resetting unit, coupled to the second timing generating unit and the flip-flops respectively, for selectively switching between the flip-flops.

5. The power converter of claim 1, wherein the calculation unit is coupled to the timing generating units, and the calculation unit receives the timing signals from the timing generating units and sums the timing signals to form the PWM signal.

6. The power converter of claim 1, wherein the timing generating units comprises:
 a first timing generating unit, coupled between the logic unit and the calculation unit, for calculating a first on-time according to the control signal at a first time; and
 a second timing generating unit, coupled between the logic unit and the calculation unit, for calculating a second on-time according to the control signal at a second time,
wherein a time interval between the first time and the second time is a delay time.

7. The power converter of claim 6, wherein the logic unit comprises:
 the plurality of flip-flops comprising a first flip-flop and a second flip-flop, wherein the first flip-flop is coupled between the comparator and the first timing generating unit, the second flip-flop is coupled between the comparator and the second timing generating unit, the first flip-flop and the second flip-flop output the control signal to the first timing generating unit and the second timing generating unit respectively; and
 a delay unit, coupled between the flip-flops and the timing generating units respectively, for generating the delay time to the first timing generating unit or the second timing generating unit according to the control signal.

8. A method of operating a power converter, the power converter comprising a comparator and a timing generator, the method comprising steps of:
 (a) using the comparator to compare a ramp signal with an error signal to provide a control signal; and
 (b) using the timing generator to generate a plurality of timing signals according to the control signal and forming a pulse width modulation (PWM) signal according to the timing signals,
wherein at least a part of the timing signals are overlapped, the timing generator comprises a plurality of timing generating units, a logic unit, and a calculation unit, and the logic unit comprises a plurality of flip-flops coupled between the comparator and the calculation unit.

9. The method of claim 8, wherein the timing generating units comprises a first timing generating unit and a second timing generating unit, the step (b) comprises steps of:
 (b1) when the first timing generating unit receives the control signal, the first timing generating unit calculating a first stage of a first on-time according to the control signal; and
 (b2) when the first timing generating unit finishes the calculation of the first stage of the first on-time after a time interval, the second timing generating unit calculating a second stage of the first on-time and the first timing generating unit calculating a first stage of a second on-time.

10. The method of claim 8, wherein the timing generating units at least comprises a first timing generating unit and a second timing generating unit, the step (b) comprises steps of:
 (b1') when the logic unit receives the control signal, the logic unit activating the first timing generating unit to calculate a first on-time;
 (b2') after a delay time, the logic unit activating the second timing generating unit to calculate a second on-time; and
 (b3') when the first timing generating unit finishes the calculation of the first on-time, the second timing generating unit continuously calculating the second on-time.

* * * * *